(12) United States Patent
Finkelstein et al.

(10) Patent No.: US 7,584,376 B2
(45) Date of Patent: Sep. 1, 2009

(54) METHOD AND APPARATUS FOR POWER MANAGEMENT

(75) Inventors: Jeff Finkelstein, San Francisco, CA (US); Matt Crowley, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 500 days.

(21) Appl. No.: 11/508,688

(22) Filed: Aug. 23, 2006

(65) Prior Publication Data

US 2008/0052545 A1 Feb. 28, 2008

(51) Int. Cl.
*G06F 1/32* (2006.01)

(52) U.S. Cl. .................. 713/324; 713/320; 713/340

(58) Field of Classification Search ................ 713/300, 713/310, 320, 322, 323, 324
See application file for complete search history.

(56) References Cited

U.S. PATENT DOCUMENTS

| | | | |
|---|---|---|---|
| 5,010,547 A | 4/1991 | Johnson et al. | |
| 5,012,219 A | 4/1991 | Henry | |
| 5,075,684 A | 12/1991 | DeLuca | |
| 5,359,317 A | 10/1994 | Gomez et al. | |
| 5,394,140 A | 2/1995 | Wong et al. | |
| 5,430,436 A | 7/1995 | Fennell | |
| 5,612,682 A | 3/1997 | DeLuca et al. | |
| 5,650,776 A | 7/1997 | Mitchell et al. | |
| 5,705,995 A | 1/1998 | Laflin et al. | |
| 5,903,852 A | 5/1999 | Schaupp, Jr. et al. | |
| 5,958,006 A | 9/1999 | Eggleston et al. | |
| 6,148,408 A * | 11/2000 | Shimoda | 713/320 |
| 6,157,630 A | 12/2000 | Adler et al. | |
| 6,230,279 B1 * | 5/2001 | Dewa et al. | 713/324 |
| 6,834,386 B1 * | 12/2004 | Douceur et al. | 718/107 |
| 7,137,019 B2 * | 11/2006 | Hellerstein et al. | 713/323 |

\* cited by examiner

*Primary Examiner*—Dennis M Butler
(74) *Attorney, Agent, or Firm*—Foley & Lardner LLP

(57) ABSTRACT

An electronic device includes a processor configured to run a plurality of applications, a power supply coupled to the processor, and a database coupled to the processor. The database is configured to store information identifying each of the plurality of applications as being in either a first set of applications or a second set of applications. The processor monitors the power level of the power supply and is configured to disable the first set of applications when the power level reaches a predetermined power level.

25 Claims, 6 Drawing Sheets

METHOD AND APPARATUS FOR POWER MANAGEMENT

BACKGROUND

The present invention relates generally to the field of electronic devices, and more specifically, to a method and apparatus for managing power for such devices.

Electronic devices, including desktop computers, laptop computers, handheld computers, and other devices, may offer a variety of functionality to users and be provided in various configurations. For example, handheld computing devices, including "palmtops," "palmhelds," personal digital assistants (PDAs), "smart phones," or other handheld computers typically weigh less than a pound and fit in a pocket. Handheld and other computing devices typically offer users applications such as wireless telephony, e-mail, camera capabilities, music playing (e.g., MP3) features, web browsing capabilities, etc.

Users are able to utilize the various applications available on a particular electronic device so long as there is sufficient power available to the device. When the device is, for example, coupled to a wall outlet via a power cord, or stationed in a cradle having recharging and/or power features, power availability may generally not be an area of concern.

However, one of the advantages associated with many electronic devices is their portability and the ability of users to use the devices without the need of a power cord, cradle, or other device that may hinder mobility. This advantage is made possible though the use of power supplies, such as batteries, that may be attached to or housed within the device itself.

Because of the small size and portability requirements of, for example, handheld computing devices, there may be corresponding constraints on the size of internal and/or removable power supplies such as batteries. Furthermore, as the number of applications available to users of computing devices increases, so does the likelihood that integrated power supplies such as batteries will be discharged at ever-increasing rates, often inadvertently or without the user noticing.

For example, a business traveler may utilize a handheld computing device to play MP3 music files while aboard an airplane. If the user should fall asleep during the flight, the user may wake to find that his or her use of the MP3 features have fully drained the power supply for the handheld device, thus making it impossible for the user to use any applications, when the user may have a desire to use at least selected applications such as, for example, telephone or e-mail.

Accordingly, it would be advantageous to provide an electronic device that would either alert a user or automatically disable selected applications upon determining that the power supply level had reached a predetermined level. It would further be advantageous to allow a user to configure an electronic device such that the device would reserve sufficient power to support selected applications for a predetermined amount of time by disabling other applications.

Other features and advantages will be made apparent from the present specification. The teachings disclosed extend to those embodiments that fall within the scope of the appended claims, regardless of whether they provide one or more of the above-identified advantages.

SUMMARY

One embodiment relates to an electronic device comprising a processor configured to run a plurality of applications, a power supply coupled to the processor, and a database coupled to the processor The database is configured to store information identifying each of the plurality of applications as being in either a first set of applications or a second set of applications. The processor monitors the power level of the power supply and is configured to disable the first set of applications when the power level reaches a predetermined power level.

Another embodiment relates to a method for reserving power in a power supply for an electronic device. The method includes identifying a set of at least one application from a plurality of applications available on the electronic device, monitoring the power level of a power supply for the electronic device, and disabling the set of at least one application when the power level for the power supply reaches the predetermined power level.

Yet another embodiment relates to a method for reserving power for a portable computing device. The method includes configuring a database to define a group of applications available on the portable computing device, monitoring the power level of a power supply for the portable computing device, and providing a prompt to the user to approve disability of the group of applications upon the power level of the power supply reaching a predetermined power level. The database is configured responsive to a first input received from the user.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
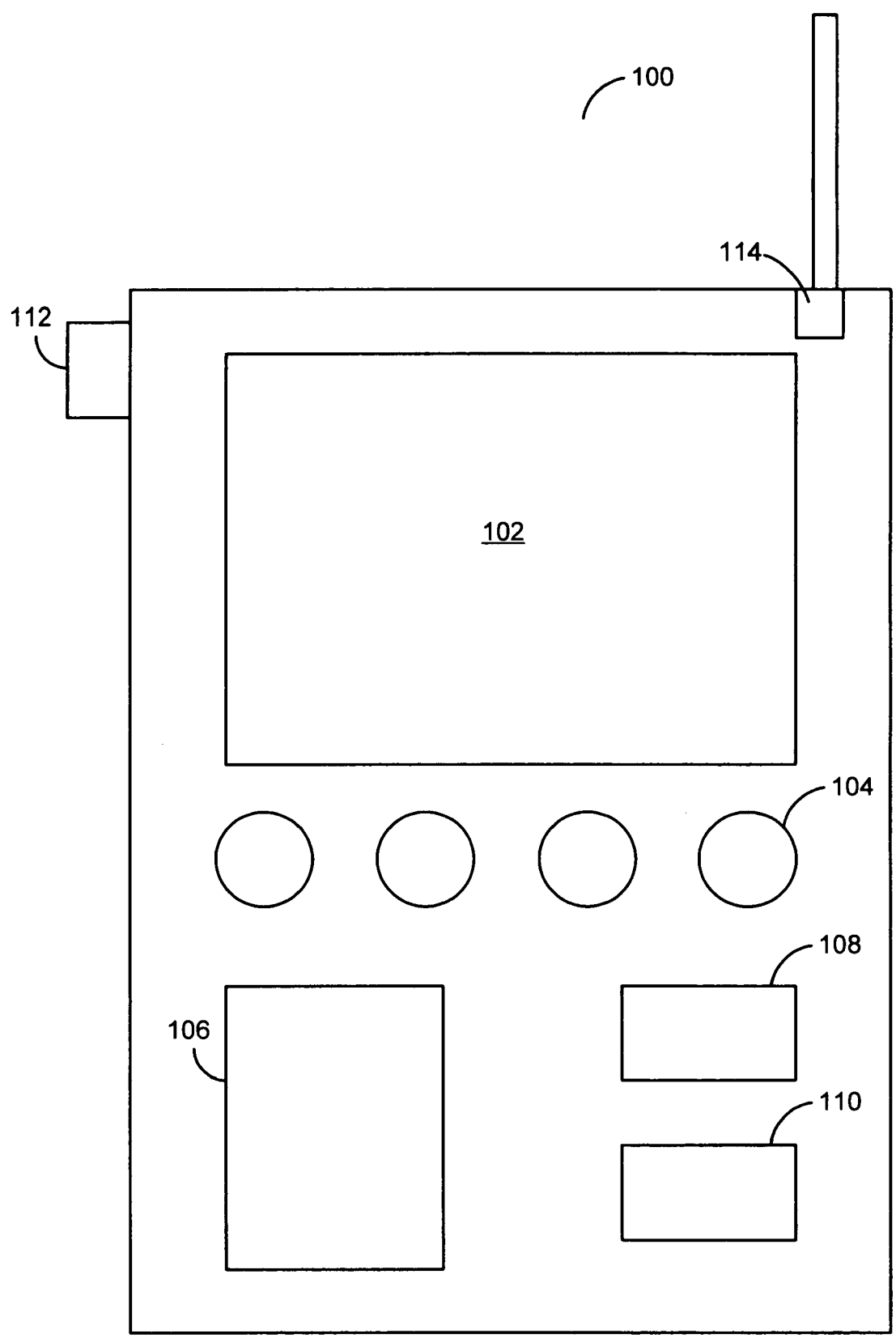
FIG. 1 is a front view of an electronic device according to an exemplary embodiment.

Referring to FIG. 1, an electronic device 100 is depicted according to an exemplary embodiment. Electronic device 100 may be a stationary (e.g., desktop) computer, a mobile (e.g., laptop, handheld, etc.) computer, or other electronic device. Examples of handheld computing devices include Palm style computers manufactured by Palm, Inc., of Santa Clara, Calif. Other exemplary embodiments may include other handheld computers and personal digital assistants, as well as mobile telephones, smart phones and other mobile computing devices.

Preferably, device 100 includes interactive hardware and software that performs functions such as maintaining calendars, phone lists, task lists, note pads, calculator applications, spreadsheets, games, and other applications capable of running on a computing device. Further, device 100 may be configured for such functions as voice memo recording and playback as well as communications network connectivity, internet connectivity, and wireless telephony.

As shown in FIG. 1, device 100 includes a display 102 and a plurality of input function keys 104. Display 102 may be provided with a touch screen interface that allows a user to select and alter displayed content using a pointer, such as but not limited to a stylus, a pen tip, a fingertip, or other pointing device. Input function keys 104 allow a user to provide additional inputs to device 100. Device 100 further includes a power supply 106 and a power interface 112. Power supply 106 may be attached to or housed within device 100 and may supply power to device 100 when device 100 is not coupled to an alternative power source via power interface 112 (e.g., via a power cord connected to a wall outlet, etc.) or other means. Power supply 106 can also comprise a rechargeable battery. Output devices such as an audio output device, shown as speaker 108, a touch-sensitive output device, shown as vibration device 110, and a visible output device, such as display 102, may also be provided in order to provide audible, touch-sensitive, and/or visual alerts, warnings, or other outputs to users of device 100. In an exemplary embodiment, a transceiver 114 may be integrated into device 100 to enable wireless network communications.

Device 100 may be configured for any of a variety of applications or processes involving wireless communications including, but not limited to, communications with the World Wide Web, mobile telephone communications, e-mail communications, global positioning system (GPS) communications, etc. Device 100 may also be configured for other applications or processes that may or may not require wireless communications including, but not limited to, playing music files (e.g., MP3 files), displaying digital photographs, playing computer-based games, etc. Device 100 may further be configured for a variety of other applications or processes.

It should be understood that device 100 may include more or fewer features than those shown in FIG. 1. Further, the features may be arranged in any suitable or alternative fashion, and may be provided in a variety of physical configurations. Such variations may be dependent on the configuration of the specific electronic device.

Figure 2:
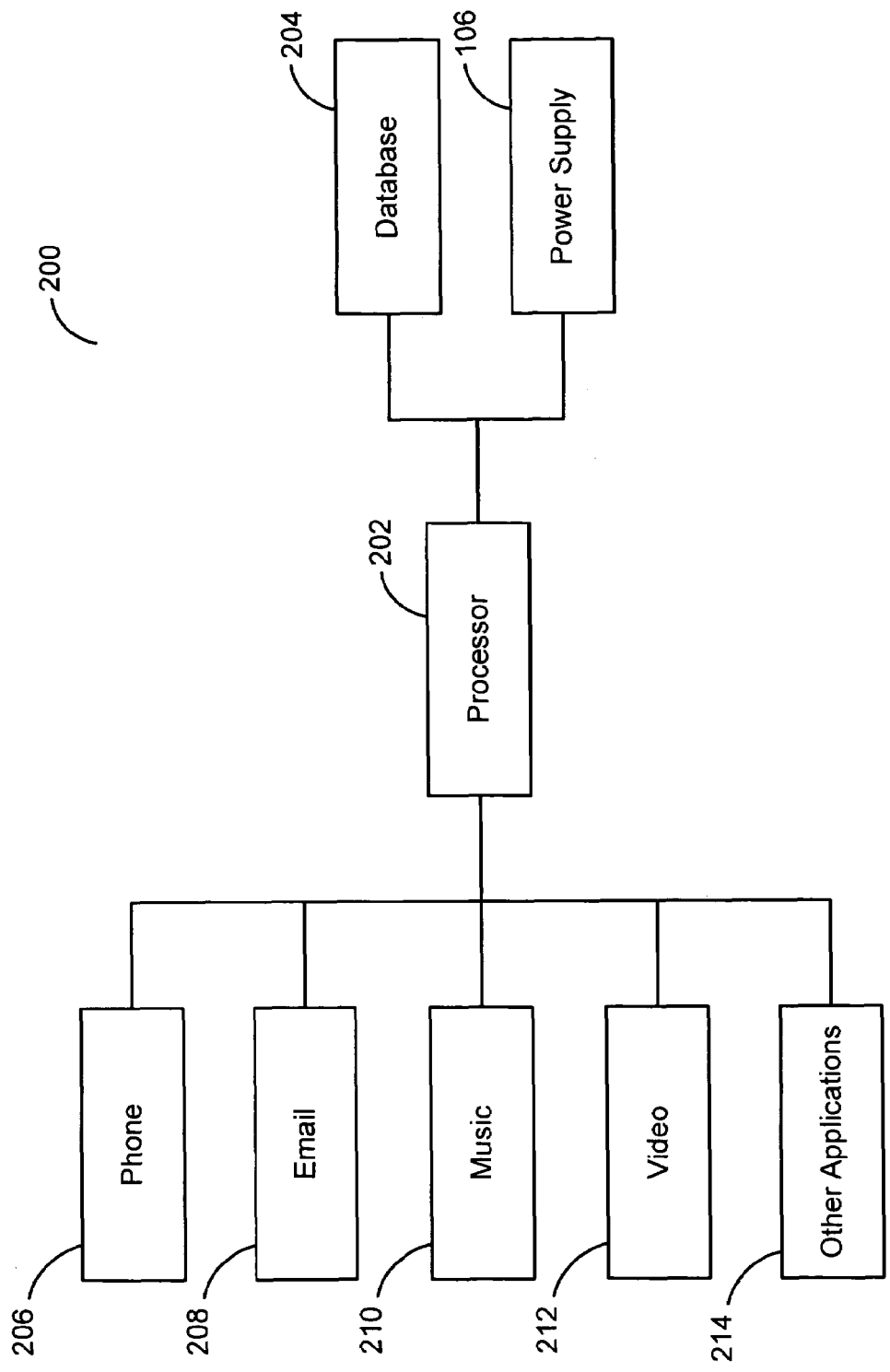
FIG. 2 is a system diagram of a power management system according to an exemplary embodiment.

Referring now to FIG. 2, a power management system 200 for an electronic device such as device 100 according to an exemplary embodiment is shown. Power management system 200 includes a processor 202 coupled to a database 204 and power supply 106. Processor 202, among other functions, is configured to operate or run one or more applications or processes on device 100. As shown in FIG. 2, the available applications or processes may include a phone application 206, an e-mail application 208; a music application 210, a video application 212, and other applications 214.

Further referring to FIG. 2, processor 202 monitors the available power in power supply 106, and can selectively disable or prevent the operation of the various applications based upon the power level of power supply 106 and the information contained in database 204. According to an exemplary embodiment, the various applications that may be run on device 100 may be identified in database 204 as being in either a first set of applications or a second set of applications. This identification can be done by a user and can be reconfigurable, or it can be done by an information technology person associated with the operation of device 100 or the user's employer or service provider. In one embodiment, the identification can be made based on whether the entity making the designation considers the application, for example, important, critical, essential, or an emergency application. Alternatively, the identification can be based on any criteria, including subjective user preferences.

The user may further specify a battery power level (e.g., a predetermined power level) at which one or more applications (e.g., the applications in the first set) are to be disabled. The predetermined power level may be specified by the user in terms of desired operation time (from which the predetermined power level may be determined) of one or more applications, or in terms of actual power amounts. The predetermined power level may further be specified on a per-application basis (e.g., where different applications may have differing predetermined power levels), or for a number of applications (e.g., where a number of different applications may have an identical predetermined power level). According to an exemplary embodiment, database 204 may store this and additional information related to the various applications. By accessing the information in database 204, and monitoring the power level in power supply 106, processor 202 may determine when the power level in power supply 106 has been depleted so as to be at or below a predetermined power level.

According to various exemplary embodiments, when processor 202 determines that the power level of power supply 106 has reached the predetermined power level, processor 202 may either generate a warning or prompt for the user, provide the user with the option to instruct processor 202 to disable certain applications (e.g., any currently-running applications identified as being in a first set of applications), and/or automatically disable certain applications. These various exemplary embodiments are discussed in further detail with respect to FIGS. 5-7. According to another exemplary embodiment, processor 202 may detect when device 100 is coupled to a power source (e.g., a wall outlet, charging cradle, etc.) other than power supply 106, such that a user may use the applications available on device 100 even when the power level of power supply 106 has reached the predetermined power level. According to various exemplary embodiments, processor 202 may disable user-interactive software applications (e.g., e-mail, phone, games, etc.), in addition to or rather than specific input/output features of device 100 (e.g., a vibrate mode, a ring mode, etc.) upon a predetermined power level being reached.

Figure 3:
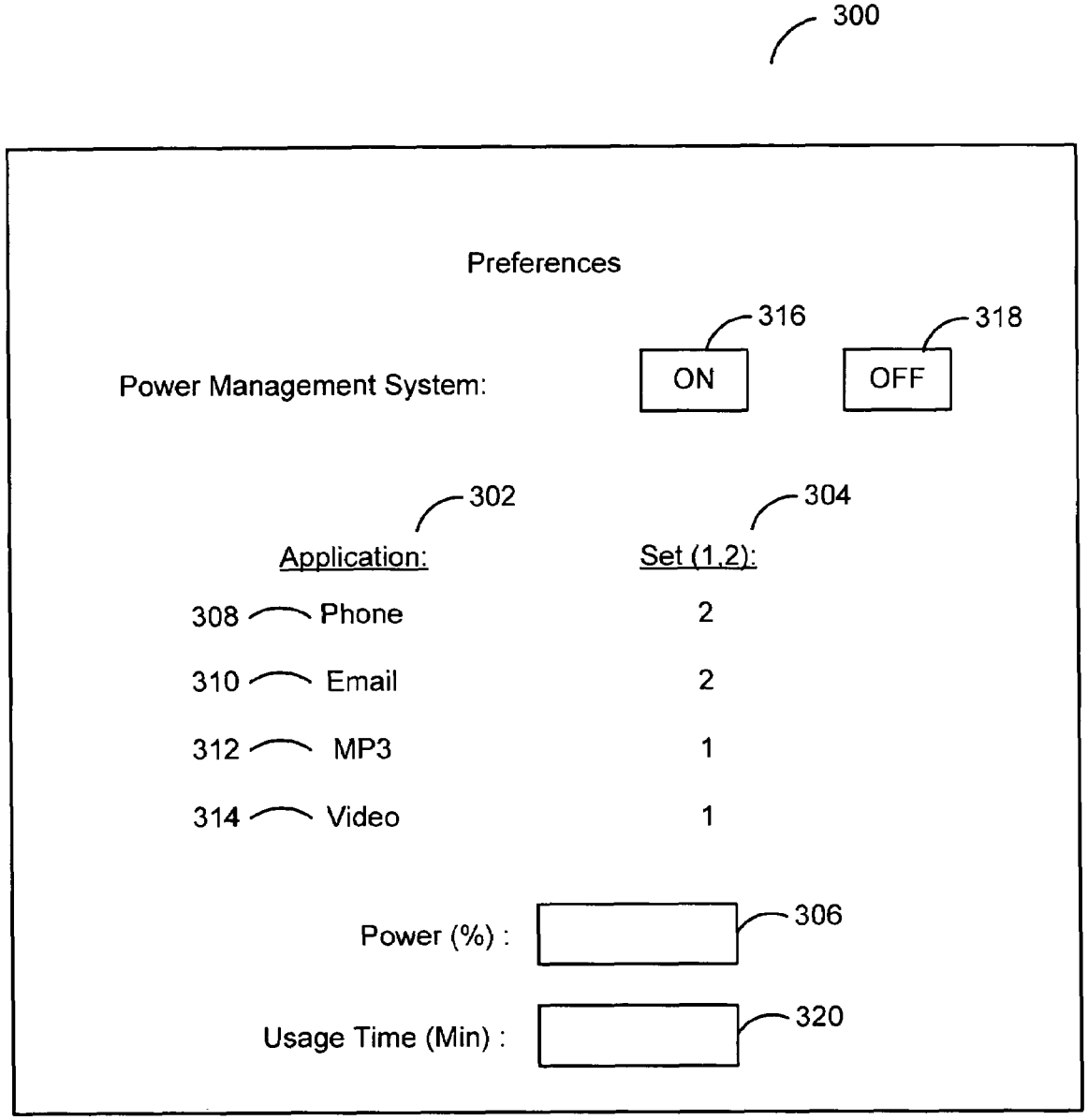
FIG. 3 is a front view of a display of a preferences page of an electronic device according to an exemplary embodiment.

Referring now to FIG. 3, an exemplary embodiment of a display of an electronic device, shown as preferences page 300, is illustrated. Page 300 permits users to enable/disable power management system 200 and/or modify or input information used to populate database 204. Page 300 may be presented to or accessed by users of device 100 via display 102. As shown in FIG. 3, according to an exemplary embodiment, a user may choose whether to enable/disable power management system 200 by selecting one of option 316 ("ON") and option 318 ("OFF"). If the user elects to disable power management system 200, power management system 200 will not provide warnings, notifications, or disability of applications, etc. to the user until power management system 200 is re-enabled. If the user enables power management system 200, the user may then modify and/or add to the information contained in page 300.

As shown in FIG. 3, display 300 may contain a list of some or all applications available to users of device 100 (see column 302). According to one embodiment, a user may identify each application in the list as either being in a first set of applications (which of course, can be a set of only one application), or a second set of applications (e.g., by specifying "1"

or "2" in column 304). The user may also specify an amount of power the user wishes device 100 to reserve for usage of certain applications (see text box 306), or an amount of usage time the user wishes to reserve for usage of certain applications (see text box 320). As shown in FIG. 3, the user is provided with the option of entering information into either of text box 306 or text box 320. According to an alternative embodiment, the user may be provided with only one of text box 306 and text box 320 as part of display 300. The information provided by users via page 300 may be used to populate database 204, and may be accessed by processor 202. For example, device 100 may be configured such that upon the power supply level reaching the power level specified in text box 306, processor 202 disables any applications in the first set of applications.

Figure 4:
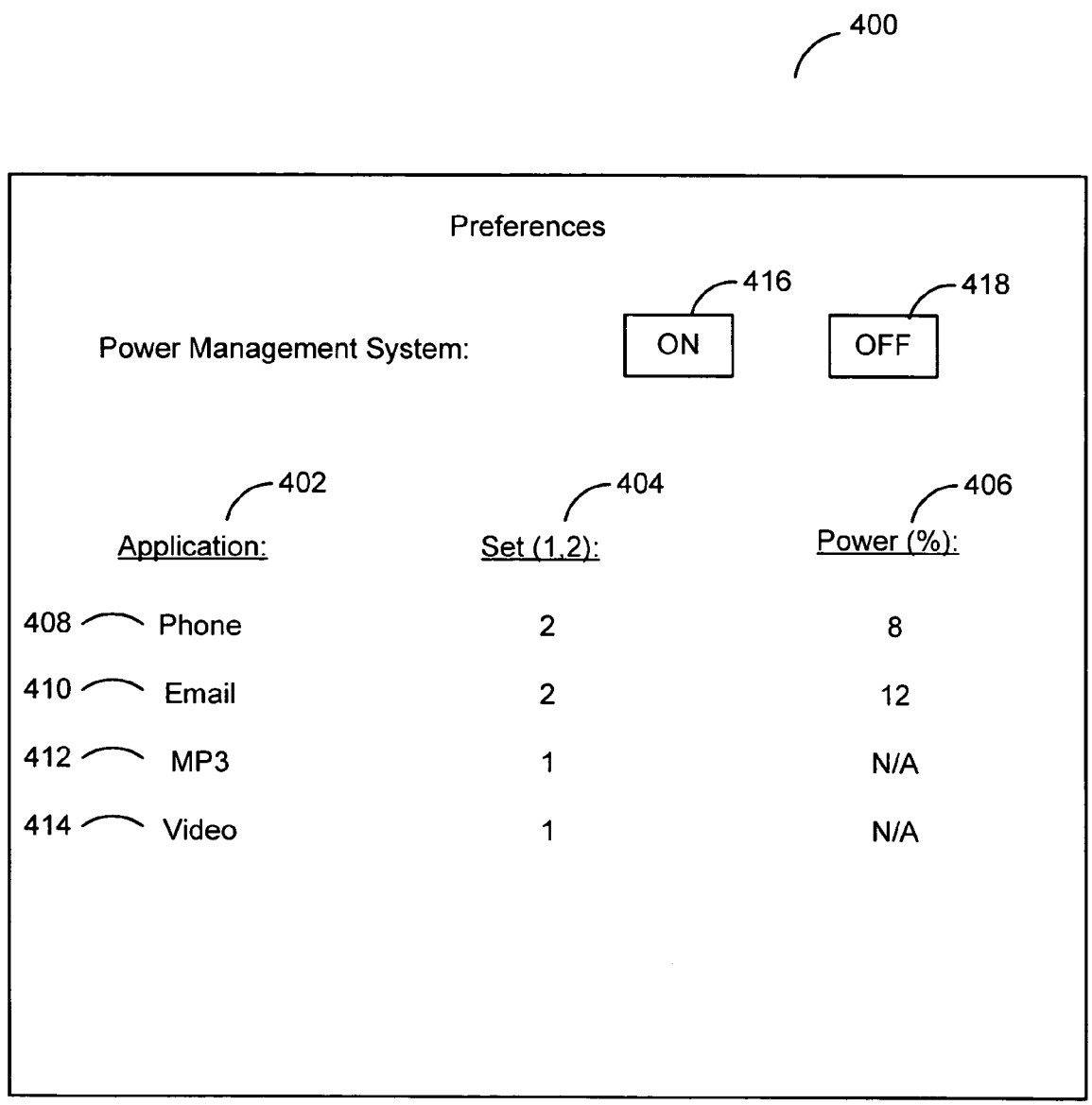
FIG. 4 is a front view of a display of a preferences page of an electronic device according to an exemplary embodiment.

As shown in FIG. 3, the user may specify, for each application, whether the application is in the first set or the second set of applications, and the user may further specify an amount of time/power to be reserved, for example, for the applications in the second set of applications. Various other configurations of page 300 may alternatively be used. Referring to FIG. 4, a display 400 according to an alternative embodiment is shown. As shown in FIG. 4, device 100 may provide users with the ability to specify power/usage time amounts on a per-application basis (see column 406). For example, as shown in entry 408 of FIG. 4, a user has specified the Phone application (column 402) as belonging to the second set of applications (column 404) and having an associated power amount of 8% (column 406). Processor 202 may use the information provided via page 400 to then determine the predetermined power level at which, for example, processor 202 may disable any applications belonging to the first set of applications (see, e.g., entries 412, 414 in FIG. 4). Other configurations of display 400 may alternatively be used (e.g., column 406 may contain usage time information rather than power amount information).

According to various other exemplary embodiments, users may be restricted from modifying any or all of the information displayed on the preferences page (such as one of the preferences pages illustrated in FIGS. 3 and 4) and therefore the corresponding information in database 204. For example, an Information Technology (IT) administrator or other entity may restrict user access to page 400 such that users may modify only one or the other of columns 404 and 406. End-users may be restricted from modifying such information in database 204 without permission (e.g., a password, etc.) from the IT administrator or other entity. For example, an IT administrator may wish to identify which applications are in each of the first and second set, and provide users with the ability to vary only the reserve time/power amount specified in column 406. Conversely, the reserve time/power amounts in column 406 may be specified by an IT administrator (and not configurable by end-users of device 100) with the user being given the ability to specify which applications are in each set.

According to yet another exemplary embodiment, users of device 100 are not provided with a preferences page (or similar display), and power management system 200 is continuously and automatically enabled. The information in database 204 may be pre-entered by an IT administrator and/or other person or entity according to any of the various embodiments described herein or according to any other suitable method. According to an alternative embodiment, the information in database 204 may further be remotely configured by using transceiver 114 on device 100 to receive wirelessly transmitted inputs from a remote server.

Much of the information shown in FIGS. 3 and 4 may be stored in database 204. For example, database 204 may include information regarding how a user has identified each application (e.g., as belonging to either the first or second set of applications, etc.), the amount of power or usage time the user wishes to reserve for certain applications, and so on. Processor 202 may determine a predetermined power level at which certain applications may be disabled and further store the predetermined power level in database 204. Other information may also be stored in database 204.

Processor 202 may access certain information included in database 204 to determine the predetermined power level, and the predetermined power level may be calculated in various ways. For example, if device 100 permits a user to enter one or more power amounts into a preferences page such as one of the pages shown in FIGS. 3 and 4, processor 202 may determine the predetermined power level based upon the power amount(s) entered by the user. Alternatively, should device 100 permit a user to specify desired usage times for certain applications, processor 202 may calculate the predetermined power level based upon the usage time(s) provided by the user (e.g., by taking into account power consumption rates, etc.). Other means of calculating the predetermined power level may alternatively be used.

The electronic device and power management system described herein with respect to various exemplary embodiments of the invention may be utilized in the performance of power management procedures intended to provide advantages over traditional methods. According to an exemplary embodiment, prior to utilizing the various applications available to a user of device 100, a user (or IT administrator or other entity) identifies each application as being in a first set or a second set of applications and the desired time (or power) allocation for the applications in the second set via page 300. Processor 202 stores this information in database 204. Processor 202 may then calculate the predetermined power level for device 100 based on the information stored in database 204 according to any of the methods described herein. Power management system 200 may then monitor the power level in power supply 106 and disable or otherwise prevent the usage of applications in the first set upon the power level reaching the predetermined power level in order to reserve power for applications in the second set in accordance with the information stored in database 204.

Figure 5:
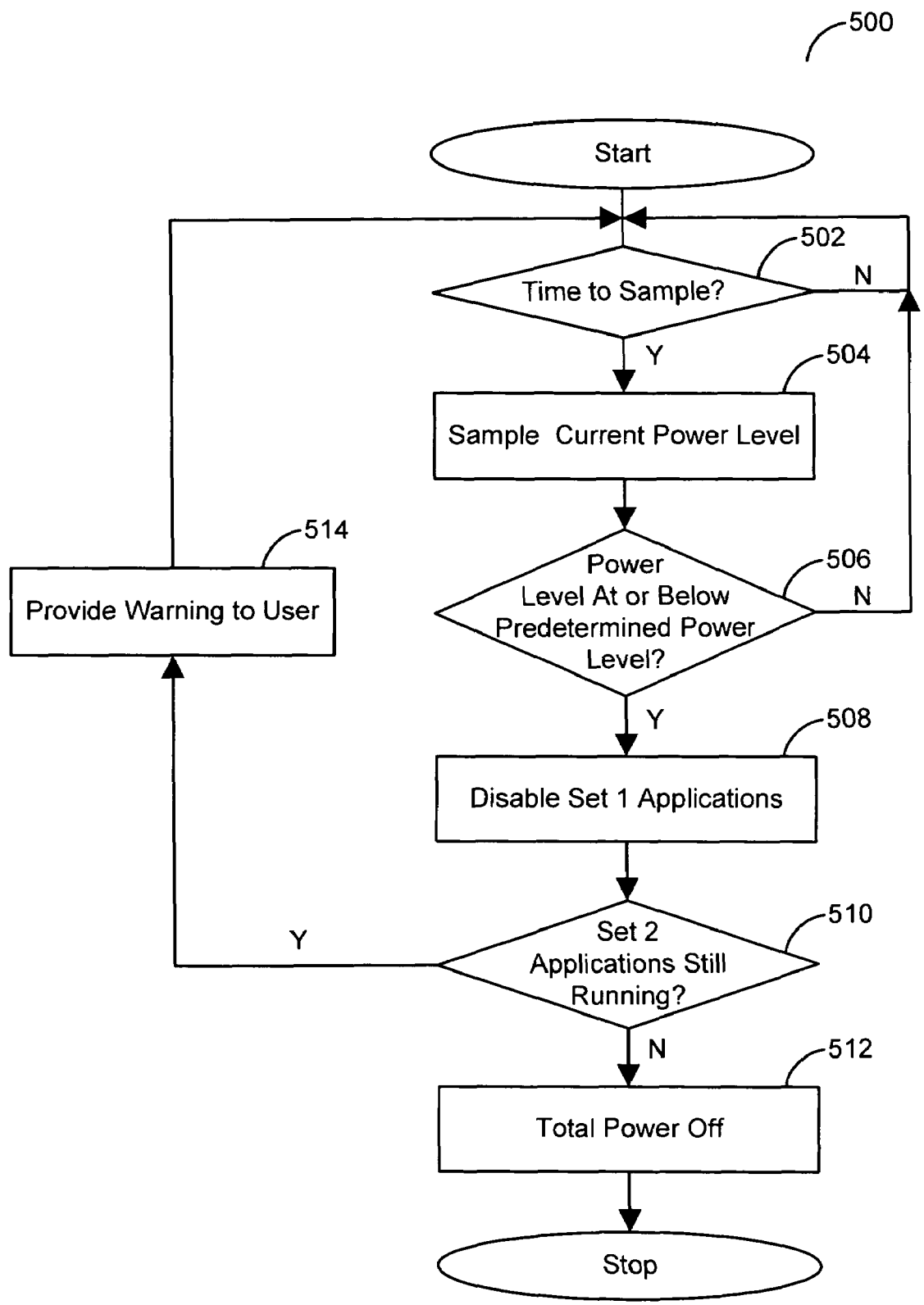
FIG. 5 is a flowchart depicting the steps of managing power in an electronic device according to an exemplary embodiment.

Referring to FIG. 5, a flowchart according to an exemplary embodiment shows the process of managing the power of a device such as device 100 described with respect to FIGS. 1-4, upon determining the predetermined power level for device 100. At step 502, processor 202 determines whether it is time to sample the power level of power supply 106. The time between samplings may be any suitable interval, and sampling may be done on a continuous basis. According to an exemplary embodiment, a user of device 100 may set the time period between samplings of the power level of power supply 106. Once processor 202 determines that it is time to sample the power in power supply 106, power management system 200 proceeds to step 504.

A step 504, processor 202 samples the current power level in power supply 106. As discussed with respect to step 502, power supply 106 may be monitored by processor 202 on a continuous basis or intermittently (e.g., every 15 seconds, every minute, etc.). Processor 202 is coupled to power supply 106 and may retrieve power level information from power supply 106 using any suitable means known in the art.

At step 506, processor 202 compares the current power level in power supply 106 to the predetermined power level. If the power remaining in power supply 106 is at or below the predetermined power level, then power management system 200 proceeds to step 508. If the power remaining in power supply 106 is greater than the predetermined power level, then power management system 200 returns to step 502.

At step 508, according to an exemplary embodiment, processor 202 automatically disables any applications in the first set of applications that are currently running. For example, if a user is using an application in the first set of applications (e.g., such as listening to music using device 100), and processor 202 detects that the predetermined power level has been reached, processor 202 will disable the application in order to reserve power for applications identified in database 204 as being in the second set of applications. This may be particularly useful in situations where a user may be unaware of the power drain from power supply 106 (e.g., if the user is sleeping while using one or more applications on device 100).

Figure 6:
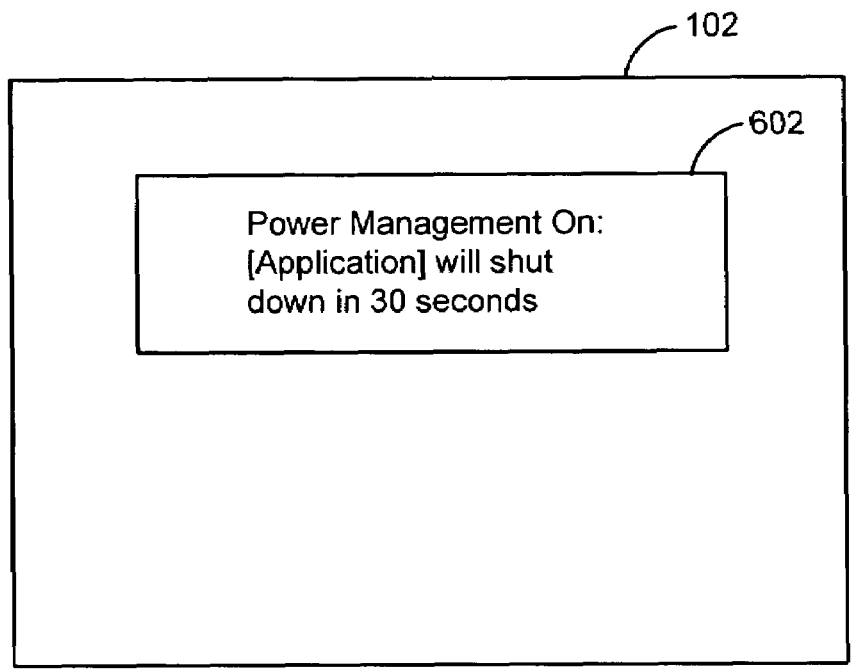
FIG. 6 is a front view of a display of an output provided to a user of an electronic device according to an exemplary embodiment.

According to another exemplary embodiment, in addition to automatically disabling any applications in the first set at step 508, processor 202 may also provide the user with a user notification or prompt, shown as notification 602 in FIG. 6, via display 102 indicating that one or more applications are being disabled. For example, as shown in FIG. 6, a user notification may include text stating "Power Management On: [Application] will shut down in 30 seconds." According to another exemplary embodiment, the user may be provided with an option (e.g. via a computer-generated icon displayed on display 102) of delaying the disable procedure for a certain amount of time (e.g., 1 minute) in order to properly close the application, save work-in-progress, etc.

Figure 7:
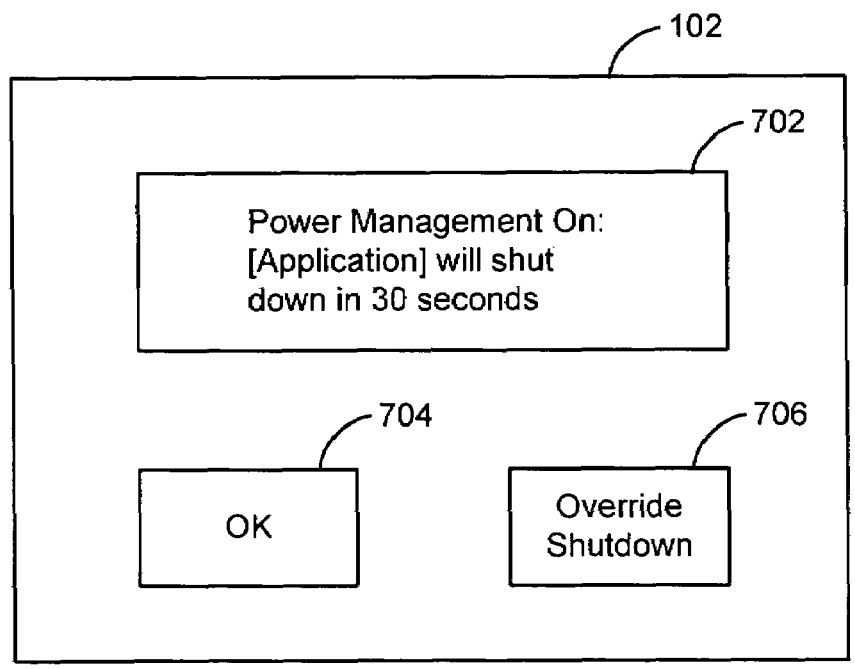
FIG. 7 is a front view of a display of an output provided to a user of an electronic device according to an exemplary embodiment.

In yet another exemplary embodiment, at step 508 users of device 100 may be provided with override capabilities enabling a user to override the disable function of power management system 200. As shown in FIG. 7, the user may be provided a notification 702 similar to notification 602 shown in FIG. 6. However, as shown in FIG. 7, the user may also be provided with option 704 ("OK") and option 706 ("Override Shutdown"). By selecting option 704, a user may accept the disabling of the applications. By selecting option 706, a user may override the disable function of power management system 200 and continue to use applications in the first set. According to an exemplary embodiment, by overriding power management system 200, the user directs processor 202 to disable power management system 200, after which the user is provided with no further warnings/notifications, or disability of applications, etc. until re-enabling power management system 200. According to another exemplary embodiment, upon receiving an override input from a user, power management system 200 delays for a predetermined period of time (e.g., 1 minute, 2 minutes, etc.), and then commences again at step 502.

As shown in FIGS. 6 and 7, power management system may utilize a visual display to indicate that the predetermined power level has been reached and/or processor 202 is disabling one or more applications. Other notifications may also be provided to users through the use of various other output devices included with device 100, such as speaker 108 and/or vibration device 110. Other means of notifying a user that one or more applications is being disabled may also be used. Upon disabling the one or more applications, power management system 200 proceeds to step 510.

At step 510, processor 202 confirms whether one or more applications in the second set of applications are still running For example, a user running an application in the first set (e.g., listening to an MP3 music file) may simultaneously be running an application in the second set (e.g., checking e-mail). After disabling the application in the first set, the application in the second set may still be in use. If so, then power management system 200 proceeds to step 514. If there are no applications in the second set of applications still running, power management system 200 proceeds to step 512

At step 512, upon determining that no applications in the second set are still running, processor 202 may shut off all power to device 100 to maximize power conservation. Alternatively, processor 202 may direct device 100 to enter a "sleep" mode by, for example, disabling display 102 and other functions until an input (e.g., a keystroke, an input to a touch screen, etc.) is received from the user, or another event occurs (e.g., device 100 receives an incoming e-mail/phone call).

At step 514, upon determining there are one or more applications in the second set still actively running, processor 202 may provide a warning to the user that the predetermined power has been reached and one or more applications are still in use. Power management system 200 then proceeds back to step 502.

One example of how users may benefit from utilizing power management system 200 involves business travelers. Consider a traveler listening to MP3 music files using a smart phone while on a cross-country flight. Should the traveler fall asleep during flight, he or she may awake to a depleted battery and be unable to use, for example, telephone and/or e-mail features (without the use of power management system 200). With power management system 200, the traveler could configure the smart phone prior to the flight to reserve a predetermined amount of power for telephone, e-mail, etc., and wake with sufficient power to utilize such applications (e.g., as a result of the processor disabling the MP3 player of the device being used by the traveler).

For purposes of illustration, several embodiments described herein identify the applications available to users of device 100 as belonging to a "first set" or "second set" of applications. It should be understood that various other ways of identifying, classifying, etc. the various applications may be used (e.g., the applications may be identified as "essential/non-essential," "critical/non-critical," etc.).

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An electronic device, comprising:
a processor configured to run a plurality of applications;
a power supply coupled to the processor; and
a database coupled to the processor and configured to store information identifying whether each of the plurality of applications is in either a first set of applications or a second set of applications;
wherein the processor is configured to monitor the power level of the power supply and disable operation of applications in the first set of applications based on the power level reaching a predetermined power level, wherein the processor is further configured to prompt the user to approve the disability of the first set of applications.

2. The electronic device of claim 1, wherein the database is configurable by a user of the electronic device.

3. The electronic device of claim 2, further comprising:
an input device coupled to the processor; and
a display coupled to the processor;
wherein the database is configurable according to at least one input received via the input device, the at least one input received being responsive to information displayed to the user via the display.

4. The electronic device of claim 3, wherein the at least one input identifies an amount of power and the processor determines the predetermined power level based upon the amount of power.

5. The electronic device of claim 3, wherein the at least one input identifies an amount of usage time for at least one application and the processor determines the predetermined power level based upon the usage time.

6. The electronic device of claim 2, further comprising:
a transceiver coupled to the processor;
wherein the database is configurable according to signals received via the transceiver from a remote location.

7. The electronic device of claim 1, wherein the prompt is at least one of a visible output signal, an audible output signal, and a touch-sensitive output signal.

8. The electronic device of claim 1, wherein the electronic device is a handheld device.

9. A method for reserving power in a power supply for a electronic device, comprising:
identifying a set of at least one application from a plurality of applications available on an electronic device;
monitoring the power level of a power supply for the electronic device;
disabling the set of at least one application when the power level for the power supply reaches a predetermined power; and providing a prompt to a user to approve the disability of the set of at least one application upon the power level reaching the predetermined power level.

10. The method of claim 9, further comprising:
receiving a first input from a user of the electronic device;
wherein the set of at least one application is determined based upon the first input.

11. The method of claim 10, further comprising:
receiving a second input from the user of the electronic device;
wherein the predetermined power level is determined based upon the second input.

12. The method of claim 11, wherein the second input is an amount of time.

13. The method of claim 11, wherein the second input is an amount of power.

14. The method of claim 11, wherein at least one of the first input and the second input is received from a remote location via a wireless communication link.

15. The method of claim 9, wherein the prompt is at least one of a visible output signal, an audible output signal, and a touch-sensitive output signal.

16. The method of claim 9, wherein the electronic device is a handheld device.

17. A method for reserving power for a portable computing device, comprising:
configuring a database for a portable computing device responsive to a first input received from a user of the portable computing device, the first input defining a group of applications available on the portable computing device;
monitoring the power level of a power supply for the portable computing device; and
providing a prompt to the user to approve disability of the group of applications upon the power level of the power supply reaching the predetermined power level.

18. The method of claim 17, wherein the prompt is at least one of a visible signal, an audible signal, and a touch-sensitive signal.

19. The method of claim 17, further comprising:
receiving approval from the user in response to the prompt; and
disabling any of the applications in the group of applications that are running.

20. The method of claim 17, further comprising:
receiving disapproval from the user in response to the prompt; and
providing a second prompt to the user upon delaying a predetermined period of time after receiving the disapproval from the user, the second prompt requesting approval of disability of the group of applications.

21. The method of claim 17, further comprising:
configuring the database responsive to a second input received from the user, wherein the predetermined power level is determined based upon the second input.

22. The method of claim 21, wherein the second input is an amount of power.

23. The method of claim 21, wherein the second input is an amount of time.

24. The method of claim 21, wherein at least one of the first input and the second input are received via a wireless communication link from a remote location.

25. The method of claim 17, wherein the portable computing device is a handheld computing device.

* * * * *

UNITED STATES PATENT AND TRADEMARK OFFICE
CERTIFICATE OF CORRECTION

PATENT NO.        : 7,584,376 B2                                    Page 1 of 1
APPLICATION NO.   : 11/508688
DATED             : September 1, 2009
INVENTOR(S)       : Jeff Finkelstein and Matt Crowley It is certified that error appears in the above-identified patent and that said Letters Patent is hereby corrected as shown below:

Column 9, claim 9, line 33: insert --level-- after the word "power"

Signed and Sealed this

Seventeenth Day of November, 2009

David J. Kappos
*Director of the United States Patent and Trademark Office*